United States Patent [19]
Szarmes

[11] Patent Number: 5,590,148
[45] Date of Patent: Dec. 31, 1996

[54] BIREFRINGENT BEAMSPLITTER FOR HIGH POWER LASERS AND LASER APPLICATIONS

[75] Inventor: Eric B. Szarmes, Durham, N.C.

[73] Assignee: Duke University, Durham, N.C.

[21] Appl. No.: 295,169

[22] Filed: Aug. 24, 1994

[51] Int. Cl.⁶ .................................................. H01S 3/08
[52] U.S. Cl. ............................................. 372/105; 372/19
[58] Field of Search .................................. 372/19, 27, 105

[56] References Cited

U.S. PATENT DOCUMENTS

| | | | |
|---|---|---|---|
| 4,208,636 | 6/1980 | German | 372/105 |
| 4,276,518 | 6/1981 | Ferguson | 372/105 |
| 4,682,340 | 7/1987 | Dave et al. | 372/105 |
| 5,018,153 | 5/1991 | Chien et al. | 372/105 |
| 5,038,360 | 8/1991 | Negus et al. | 372/105 |
| 5,091,912 | 2/1992 | Bretenaker et al. | 372/105 |
| 5,091,913 | 2/1992 | Zhang et al. | 372/105 |
| 5,119,383 | 6/1992 | Duling et al. | 372/105 |
| 5,130,994 | 7/1992 | Madey et al. | |
| 5,175,736 | 12/1992 | Woodward et al. | 372/105 |

FOREIGN PATENT DOCUMENTS 2851147  10/1979  Germany ................................ 372/105

Primary Examiner—Rodney B. Bovernick
Assistant Examiner—Robert E. Wise
Attorney, Agent, or Firm—Cushman Darby & Cushman, L.L.P.

[57] ABSTRACT

The design and application of an uncoated sapphire crystal as a beamsplitter and output coupler of a laser resonator includes placing the crystal sufficiently close to the Brewster angle to intercept a beam from a lasing medium in a free electron laser to provide a Fox-Smith type resonator or a Michelson type resonator depending on the optical path through the crystal to enable use of high power lasers in interferometric and optical coupling measurements.

27 Claims, 11 Drawing Sheets ns and fluences, and provide roughly
BIREFRINGENT BEAMSPLITTER FOR HIGH POWER LASERS AND LASER APPLICATIONS This invention was made with Government support under Grant No. N00014-91-C-0226 awarded by the Office of Naval Research.

BACKGROUND OF THE INVENTION

The present invention relates to the splitting of extremely high power laser beams within or without a high power optical resonator.

Many applications involving the manipulation of laser beams require that the beam be split into two beams of comparable relative intensity. Beamsplitters are usually fabricated for this purpose by depositing a thin-film optical coating on a transmissive substrate (in fact, two coatings are often required: one on the front surface to provide a sufficiently high reflectance, and one on the back surface to eliminate reflections of the transmitted beam from that surface.) However, the optical beams from high power lasers are often capable of damaging or evaporating the coating, particularly if the beamsplitter is installed directly within the cavity of such lasers where the optical intensities and fluences can be many orders of magnitude greater than those outside of the laser cavity. Multi-mirror resonators, for example, incorporate such beamsplitters as an important and practical means of controlling the longitudinal mode structure and obtaining stable, single-frequency laser oscillation. But even in applications of high power laser beams outside of the laser resonator, such as optical autocorrelation, the beamsplitter must be able to withstand extremely high incident optical intensities and fluences, and provide roughly the same power into each of the resulting beams without damaging.

Apart from the ability to withstand optical damage, beamsplitters must often be designed to operate over a wide range of wavelengths. However, broadband coatings are difficult and expensive to design and manufacture, and often possess a reduced damage threshold. An example of an extremely high power and broadband laser system requiring an intracavity beamsplitter is the phase locked free-electron laser (FEL), in which the interferometric coupling of successive optical pulses induces temporal phase coherence among the otherwise randomly phased pulses in the resonator (see, for example, U.S. Pat. No. 5,130,994). In such a laser, the temporal and spectral features of the individual pulses are preserved, but the interpulse coherence of the output pulse train is characterized by an axial mode separation equal to the rf frequency of the linac instead of the round-trip frequency of the resonator. The most practical configurations of these lasers employ a multi-mirror resonator such as a Michelson or Fox-Smith interferometer, in which the beamsplitter provides the interpulse coupling. Such lasers have important applications in high resolution, nonlinear spectroscopy and, given the appropriate optics, can typically be tuned over several octaves.

In extracavity applications of beamsplitters, such as optical autocorrelation, the power requirements of a given coating may be relaxed somewhat by increasing the area of the incident beam, a solution which is usually not available for intracavity applications. However, broadband designs remain an important requirement for applications to FELs and other tunable sources such as dye lasers. For example, optical autocorrelators are used to measure the duration of ultrashort optical pulses from each of these lasers, and are usually limited in bandwidth and tunability by the beamsplitter. These devices operate by splitting an incident pulse into two pulses of roughly equal intensity and then recombining them with a variable degree of temporal delay; the pulse duration is then inferred from the resulting interference signal. In such applications, thin-film coatings can entail an additional complication: improperly designed coatings can result in a temporal distortion of the optical pulse as it propagates through and is reflected from the beamsplitter.

SUMMARY OF THE INVENTION

The present invention consists of a broadband, birefringent beamsplitter for high power interferometric resonators and other laser applications that provides sufficient reflectance without the use of any coatings.

The birefringent beamsplitter is simply an uncoated, parallel plate, composed of a suitable birefringent material and inclined near the Brewster angle, which uses S-polarized (i.e. transverse electric, or TE) reflection at one of the surfaces to provide the beamsplitting action; for practical angles of incidence greater than or equal to the Brewster angle, reflectances of 25% to 55% can be obtained. Large reflections at the second surface are eliminated by exploiting the birefringence to yield P- (i.e. transverse magnetic, or TM-) polarization at that surface, so that the beam can be transmitted with low losses, even zero losses if the angle of incidence equals the Brewster angle. In interferometric resonators, maintaining low cavity losses at the second surface is a fundamental requirement for laser oscillation, but even if the angle of incidence differs only slightly from the Brewster angle, then these reflections provide an efficient method of outcoupling the laser beam.

The present invention differs from the previous application of birefringent sapphire beamsplitters as pump beam couplers in oscillator-amplifier dye laser systems (M. M. Broer, C. G. Levey, E. Strauss, and W. M. Yen, "Variable birefringent beam splitter," Appl. Opt. 20, 1011–1014, 1981.) Such applications require only a small, adjustable reflectance, typically less than 20%, which is obtained in a given beamsplitter by rotating the orientation of the optical c-axis relative to the input polarization; the relative phase retardation between the ordinary and extraordinary polarization components can be arbitrary, yielding arbitrary polarizations for both the reflected and transmitted beams. In contrast, the application of the present invention to interferometric resonators is motivated by the requirement of a beamsplitter with a large, fixed reflectance for intense intracavity beams, and in such resonators the orientation of the c-axis, and the relative phase retardation at the operating wavelength, must both be constrained within limits in order to preserve linear polarization in the reflected and transmitted beams.

The constraints on the phase retardation and crystal orientation, which are described and analyzed in detail below, actually characterize the novel features of the present invention, but while they do indeed constrain the design of the beamsplitter, they also entail the means to obtain broadband tunability in the device. In certain orientations of the beamsplitter, characterized by the placement of the beamsplitting surface with respect to the polarizations of the incoming and outgoing beams, this tunability can be realized by rotating the beamsplitter about an axis perpendicular to its surface. The effect of the rotation in such cases is to shift the passband to different wavelengths while maintaining an essentially constant reflectance at the beamsplitting surface. Note that this rotation of the beamsplitter therefore serves a different purpose from the "variable birefringent beamsplitter" described in the previous paragraph: in the application to oscillator-amplifier dye laser systems, rotation is employed at a given wavelength to substantially vary the reflectance of the beamsplitter, whereas in the present invention, rotation is employed to widely tune the device without substantially varying the reflectance.

We note here that birefringent filters have been employed for many years as tuning devices in dye lasers (see, for example, D. R. Preuss and J. L. Cole, "Three-stage birefringent filter tuning smoothly over the visible region: theoretical treatment and experimental design," Appl. Opt. 19, 702–710, 1980.) Such filters typically utilize several birefringent plates, oriented at the Brewster angle, which together allow only a narrow band of wavelengths to be transmitted with negligible loss. The passband can then be shifted across the spectrum by rotating the component plates, parallel to their surfaces, by the prescribed amounts. Although the present invention is tuned in a similar manner, its purpose is manifestly different from the filters described above: those filters do not act as beamsplitters for intense intracavity beams in multi-mirror resonators. They are employed only as single-pass filters, with one input beam and one output beam, and exhibit negligible reflectance at the operating wavelength. Consequently, they are not suitable to any intracavity or extracavity applications for which the present birefringent beamsplitter is proposed.

DETAILED DESCRIPTION OF THE INVENTION

This Section describes the constraints on the design of the birefringent beamsplitter which characterize its novel features. Specific orientations of the beamsplitter are analyzed, and intracavity and extracavity applications are discussed in detail. Although the detailed description is restricted to weakly birefringent materials, the birefringent beamsplitter can in practice be constructed of any suitable birefringent material.

Figure 1A:
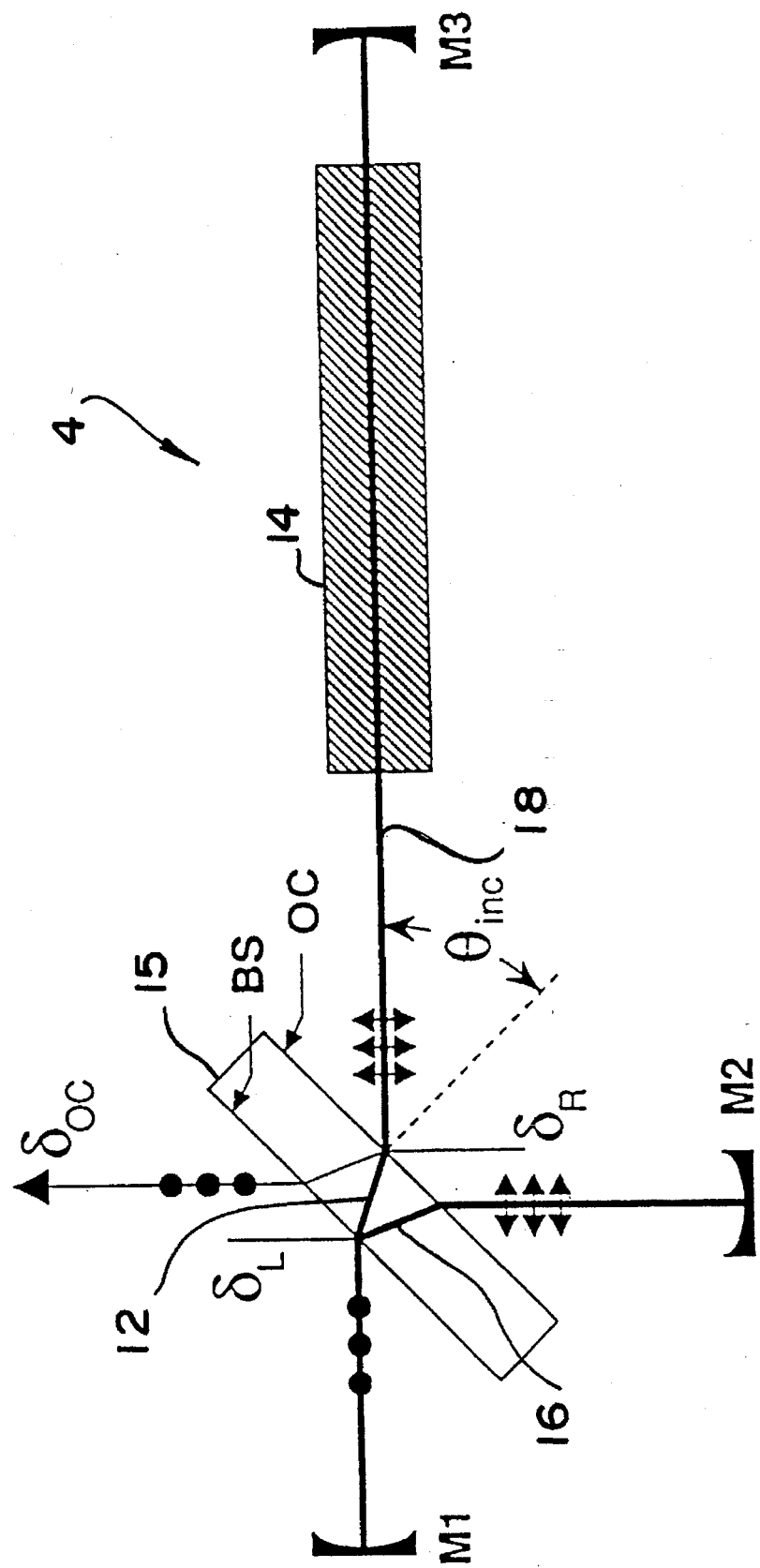
FIG. 1a illustrates a schematic view of a Michelson resonator laser with a birefringent beamsplitter and FIG. 1b illustrates schematically a Fox-Smith resonator with a birefringent beamsplitter.

The optimum design of the birefringent beamsplitter for use with a laser 4 such as a free electron laser such as is disclosed in U.S. Pat. No. 5,130,994 and which operates with a gain medium and a plurality of reflective surfaces such as mirrors M1, M2 and M3 disposed as illustrated in FIG. 1a with the birefringent crystal 15 disposed at the illustrated angle relative to the laser beam 18 which is emitted from the lasing medium 14. The crystal 15 such as sapphire is restricted in the present case to uniaxial crystals while the beam 18 can be specified at any given wavelength (the design wavelength) by enforcing the following constraints: 1) the intracavity polarization must be composed equally of ordinary and extraordinary components, which constrains the orientation of the optical crystal axis for a given angle of incidence; and 2) the relative phase retardation in a single pass must be an odd multiple of pi, which constrains the thickness. If the crystal 15 contains only a single intracavity beam 10 as in FIG. 1b, which is in all other respects identical to the FIG. 1a embodiment except for the fact that the crystal 15 is rotated so that a single high powered beam 10 passes through the crystal 15, then the c-axis can lie anywhere in a plane which contains the wave vector k̂ and is tilted at 45° to the input polarization ê. However, if the crystal contains two intracavity beams 12, 16 as in FIG. 1a, then the orientation of the c-axis is also constrained by reflection symmetry to only two directions within that plane, one lying parallel to the surface of the crystal, the other possessing a projection onto the plane of incidence which is perpendicular to the surface of the crystal. These two directions, which are illustrated in FIG. 2a and 2b, satisfy the design constraints in all cases and can be analyzed in detail.

The beamsplitter works most efficiently for weakly birefringent materials such as sapphire or quartz, in which case the design and analysis are also considerably simplified. In such materials, double refraction, Poynting vector walkoff, and polarization mixing at the surfaces can all be neglected, and reflection and refraction can be described by the Fresnel coefficients and Snell's law in terms of a single refractive index n given, for example, by $$n = \frac{1}{2} [n_o + n_e], \quad (1)$$

where $n_o$ and $n_e$ are the ordinary and extraordinary refractive indices along the principle axes of the crystal. These assertions can be justified numerically. For example, in sapphire at 3 μm the refractive indices are $n_o$=1.71 and $n_o$-$n_e$=0.0075. The angle σ between the ordinary and extraordinary k̂ vectors due to double refraction can be no greater than the difference between the critical angles for the respective indices; therefore, $\sigma^{max}$=$\sin^{-1}$ $(1/n_e)$-$\sin^{-1}$ $(1/n_o)$=3.2 mrad. The walkoff angle ρ between the Poynting vector S and the wave vector k̂ of the extraordinary wave is of a similar magnitude, with a maximum value of $\rho^{max} \approx n_o[(1/n_e)-(1/n_o)]$=4.4 mrad. Thus, in a crystal only a few millimeters thick, the corresponding transverse displacements are on the order of ten microns or less and can be neglected in comparison to beam radii of several millimeters or more. Furthermore, a calculation of the reflection and transmission coefficients for a sapphire crystal in the geometries of FIG. 2 indicates, for an angle of incidence of 71°, that the power reflected into the S-polarization from an incident P-polarized wave (and vise versa) is less than $10^{-6}$ of the incident power. Therefore, the assumption of crystal isotropy is appropriate for describing the surface interactions.

The constraint that the intracavity polarization be composed equally of ordinary and extraordinary components in the crystal can be expressed in terms of the unit wave vector $\hat{k}$, polarization vector $\hat{e}$, and c-axis vector $\hat{c}$ as $$|\widehat{(\hat{k} \times \hat{c})} \cdot \hat{e}| = \frac{1}{\sqrt{2}}, \qquad (2)$$

where $\hat{\ }$ indicates normalization. If the c-axis is parallel to the surface of the crystal (FIG. 2a), then a substitution of the unit vectors $$\hat{e} = \cos\phi\hat{x} + \sin\phi\hat{y}, \qquad (3)$$

$$\hat{k} = -\sin\phi\hat{x} + \cos\phi\hat{y}, \qquad (4)$$

and $$\hat{c} = \cos\theta_1 \hat{x} + \sin\theta_1 \hat{z} \qquad (5)$$

into Eq. (2) yields the solution $$\tan^2\theta_1 = \cos^2\phi \qquad (6)$$

Alternately, if the c-axis possesses a projection onto the plane of incidence which is perpendicular to the surface of the crystal (FIG. 2b), then $$\hat{c} = \cos\theta_2\hat{y} + \sin\theta_2\hat{z}, \qquad (7)$$

and the evaluation of Eq. (2) yields the solution $$\tan^2\theta_2 = \sin^2\phi \qquad (8)$$

Note that the propagation angle $\phi$ is the internal angle of refraction, obtained from the angle of incidence using Snell's law and Eq. (1), and that Eqs. (6) and (8) both satisfy internal reflection symmetry in the crystal: the solutions for $\theta_1$ and $\theta_2$ in terms of $\phi = \phi_0$ (the forward transmitted beam) are also the same for $\phi = \phi_0 + \pi$ (the backward transmitted beam), $\phi = \pi - \phi_0$ (the forward reflected beam), and $\phi = \phi_0$ (the backward reflected beam). This symmetric decomposition of both the transmitted (i.e. primary) and reflected (i.e. secondary) beams into equal ordinary and extraordinary components of polarization can be satisfied in general for uniaxial crystals, but not biaxial ones.

The crystal thickness $t_c$ is determined by the constraint that the phase retardation $\alpha$ in a single pass be an odd multiple of pi:

$$\alpha \equiv 2\pi[n_o - n_e(\theta)]\frac{t_c}{\lambda\cos\phi} = 2\left(m + \frac{1}{2}\right)\pi; \, m \in \text{Integers}, \qquad (9)$$

where $t_c/\cos\phi$ is the physical path length, $\lambda$ is the design wavelength in vacuum, and $n_e(\upsilon)$ is the refractive index of the extraordinary wave which depends on the angle $\upsilon$ between the $\hat{k}$ vector and the optical c-axis according to $$\frac{1}{n_e^2(\theta)} = \frac{\cos^2\theta}{n_o^2} + \frac{\sin^2\theta}{n_e^2}. \qquad (10)$$

This angle is obtained for each of the geometries in FIG. 2 by directly evaluating the vector product $$\hat{k} \cdot \hat{c} = \cos\upsilon \qquad (11)$$

in $\hat{x},\hat{y},\hat{z}$-coordinates using the expression for $\hat{k}$ from Eq. (4) and the respective solutions for $\hat{c}$. Note that the resulting solutions for the crystal thickness also satisfy internal reflection symmetry for each of the geometries of FIG. 2.

These calculations complete the design of the beamsplitter. The successive choices of the angle of incidence, crystal geometry, and order m of the phase retardation depend on the particular application. The angle of incidence determines the S-polarized reflectance and the P-polarized losses of the beamsplitter. The choice of crystal geometry depends mostly on convenience: if the c-axis is parallel to the surface of the crystal, resonator designs with significantly different angles of incidence can be realized simply by rotating the beamsplitter in the plane of the crystal; on the other hand, the geometry of FIG. 2b is intrinsically more tunable (as explained below), and allows a given order m of the phase retardation to be realized with a thicker crystal, which can ease the fabrication process. Finally, the choice of the order m determines the thickness and bandwidth of the crystal.

Design and analysis of the birefringent Michelson resonator

We proceed to calculate the cavity losses and axial mode decay rates induced by the birefringent beamsplitter in the Michelson and Fox-Smith resonators of FIG. 1. These resonators have traditionally been used in conventional lasers to obtain oscillation on a single axial mode, and have recently been used in rf linac FELs to induce interpulse coherence in the output pulse train. The use of the birefringent beamsplitter in FEL applications is particularly attractive because of its intrinsically high optical damage threshold.

Figure 1B:
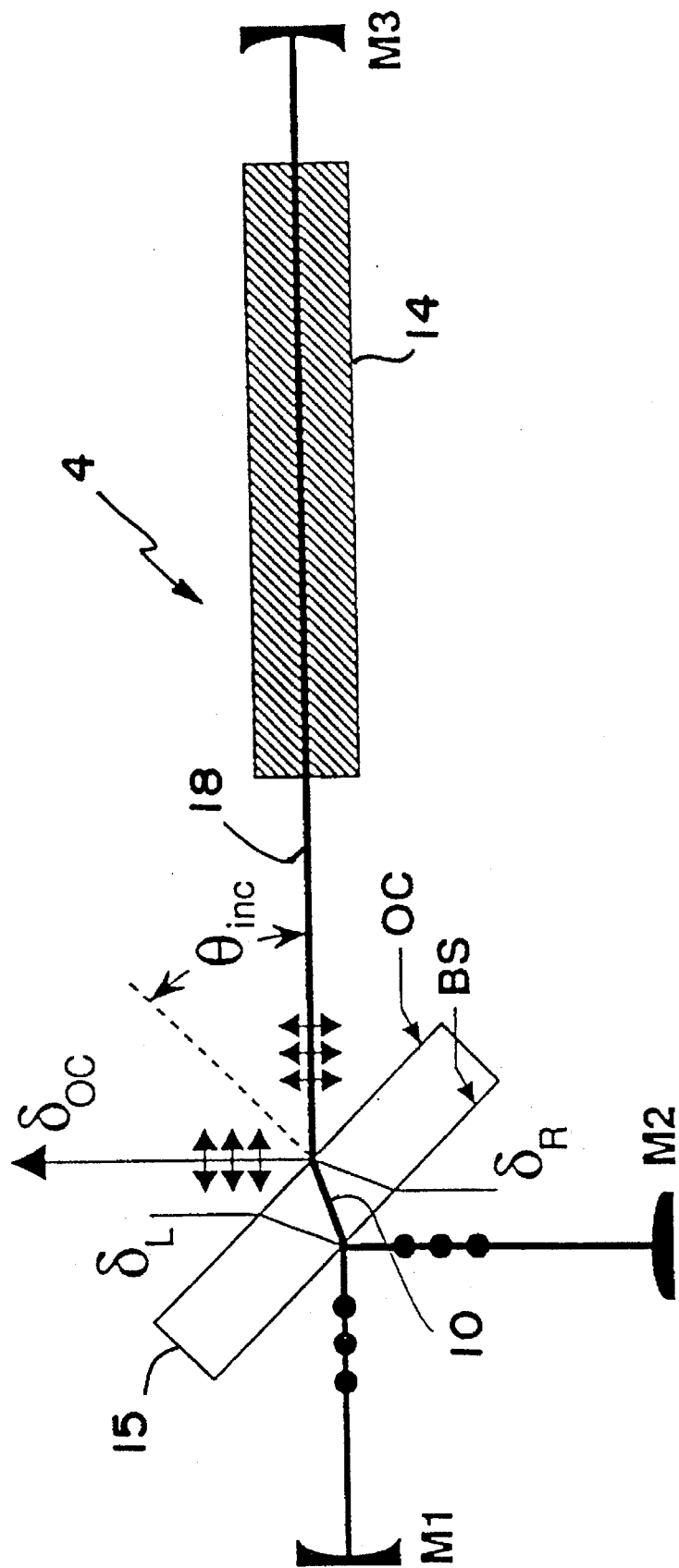
Figure 2A:
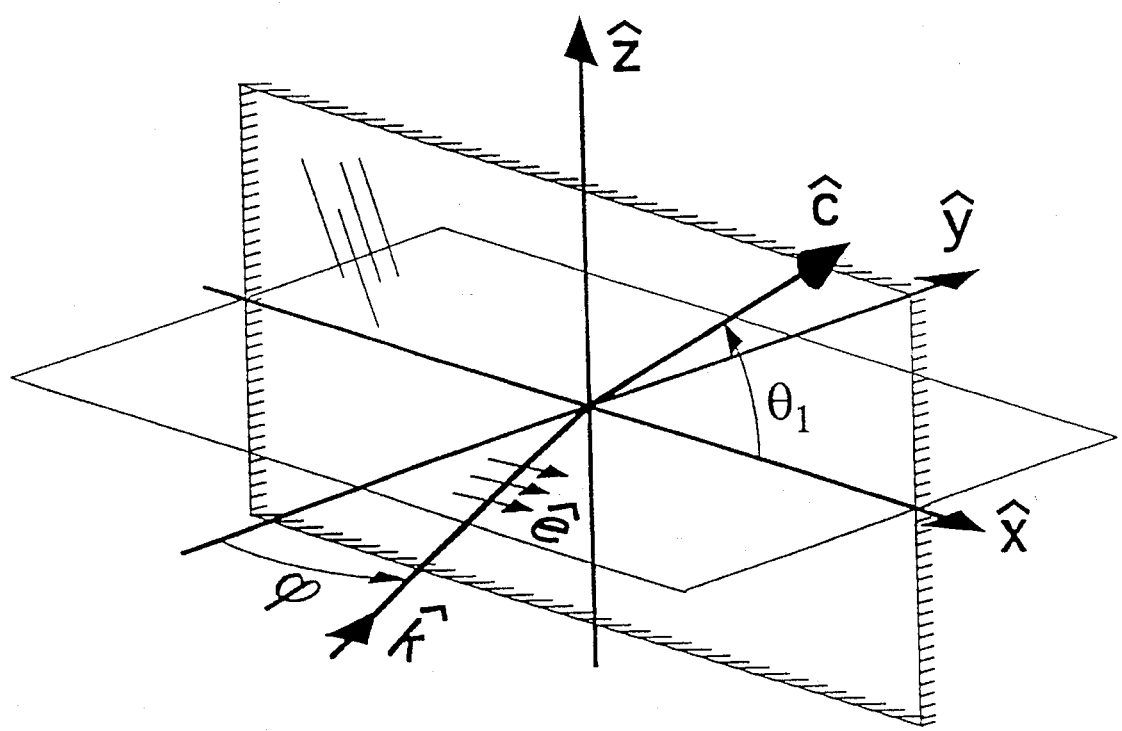
FIG. 2a schematically illustrates a crystal orientation with an optical axis in the plane of the crystal and FIG. 2b shows the optical axis possessing a projection onto the plane of incidence which is perpendicular to the surface of the crystal.
Figure 2B:
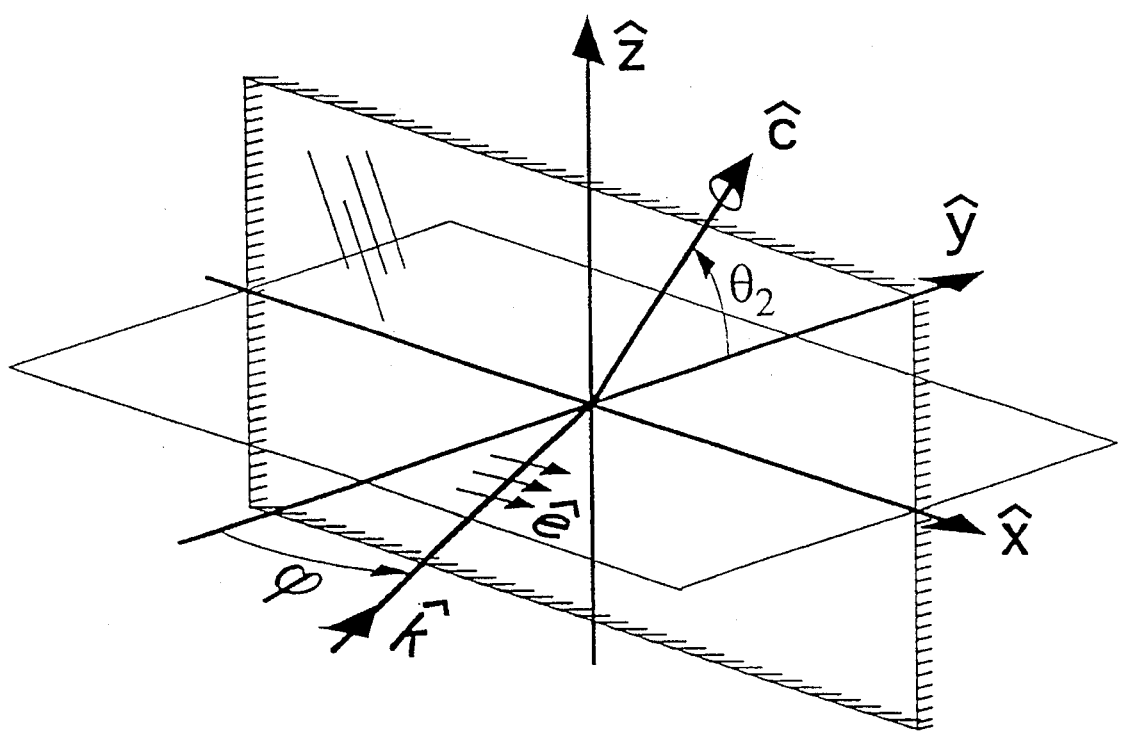

Several differences between the resonators of FIG. 1 are notable. First, in the Michelson resonator of FIG. 1a, the round-trip times in the two arms of the interferometer differ by one rf period, and every pulse couples only once to its successor after each pass through the gain medium. In the Fox-Smith resonator of FIG. 1b, the total round-trip time in the small interferometer equals one rf period, and every pulse couples to all of its successors after each pass through the gain medium. Second, we see that for large angles of incidence, the output coupling in the Michelson resonator is reduced by the S-polarized transmittance of the beamsplitter surface, in contrast to the Fox-Smith resonator which outcouples the entire P-polarized reflectance. Finally, the beamsplitter in the Fox-Smith interferometer contains only a single intracavity beam, and no lossy surfaces other than the cavity mirrors; these features are crucial to the realization of broadband tuning in the Fox-Smith device.

The birefringent cavity losses in the Michelson resonator of FIG. 1a can be calculated using the Jones matrix calculus. For a horizontally polarized gain interaction, such as in the planar wiggler FEL, we assume that pulses of unit intensity and horizontal polarization are incident on the interferometer, and define the round-trip losses to equal any power not contained in the horizontal polarization of the emerging pulses after a single reflection (these losses therefore include any power appearing in the vertical polarization, which would not be amplified but would instead suffer a large S-polarized reflection on the next pass.) In terms of the diagonal reflection and transmission matrices r(r') and t(t') for external (internal) incidence at the crystal surfaces, where r'=-r and tt'=1-r$^2$, and the symmetric matrices $M_1$ and $M_2$ describing the birefringence in a single transit of the primary and secondary beams through the crystal, the Jones matrix for a single reflection from the Michelson interferometer can be written $$M^{int} = t'M_1(e^{i\xi}r'M_2tt'M_2r' + tt')M_1t, \qquad (12)$$

where $\xi$ accounts for the relative phase shift between successive pulses at the beamsplitter, and multiple reflections within the crystal have been neglected due to the large angle of incidence (absorption losses have also been neglected but are usually much smaller than the output coupling.) Note that the two terms in parentheses operate on adjacent pulses. For an input Jones vector $[E_p \ E_s]^T = [1 \ 0]^T$ projected onto the P- and S-polarized components, the round-trip losses $\delta_{rt}$ are then given by $$\delta_{rt} = 1 - |M_{pp}^{int}|^2, \quad (13)$$

which depends on both the wavelength and the alignment of the crystal.

If the beamsplitter is perfectly aligned in either of the configurations of Section 2, with no misalignment of the optical c-axis, then the matrices $M_1$ and $M_2$ both correspond to a wave-plate rotated by 45° and can be written $$M_1 = M_2 = e^{-i\alpha/2} \begin{bmatrix} \cos\left(\frac{\alpha}{2}\right) & -i\sin\left(\frac{\alpha}{2}\right) \\ -i\sin\left(\frac{\alpha}{2}\right) & \cos\left(\frac{\alpha}{2}\right) \end{bmatrix}, \quad (14)$$

If the interferometer is also adjusted for optimum phase locking, then the laser will evolve towards a state for which $\xi = 0$ between successive pulses at the beamsplitter. In this case, the matrix element in Eq. (13) is given (to within an overall phase factor) by $$M_{pp}^{int} = (r_p'c^2 - r_s's^2)^2 t_p^2 t_p'^2 - (r_p' + r_s')^2 t_p t_p'^{40} t_s t_s' c^2 s^2 + e^{i\alpha} t_p' t_p (t_p' t_p c^2 - t_s t_s' s^2), \quad (15)$$

where c and s are shorthand notations for $\cos(\alpha/2)$ and $\sin(\alpha/2)$, and $r_{s,p}$ and $t_{s,p}$ are the Fresnel reflection and transmission coefficients.

Figure 3:
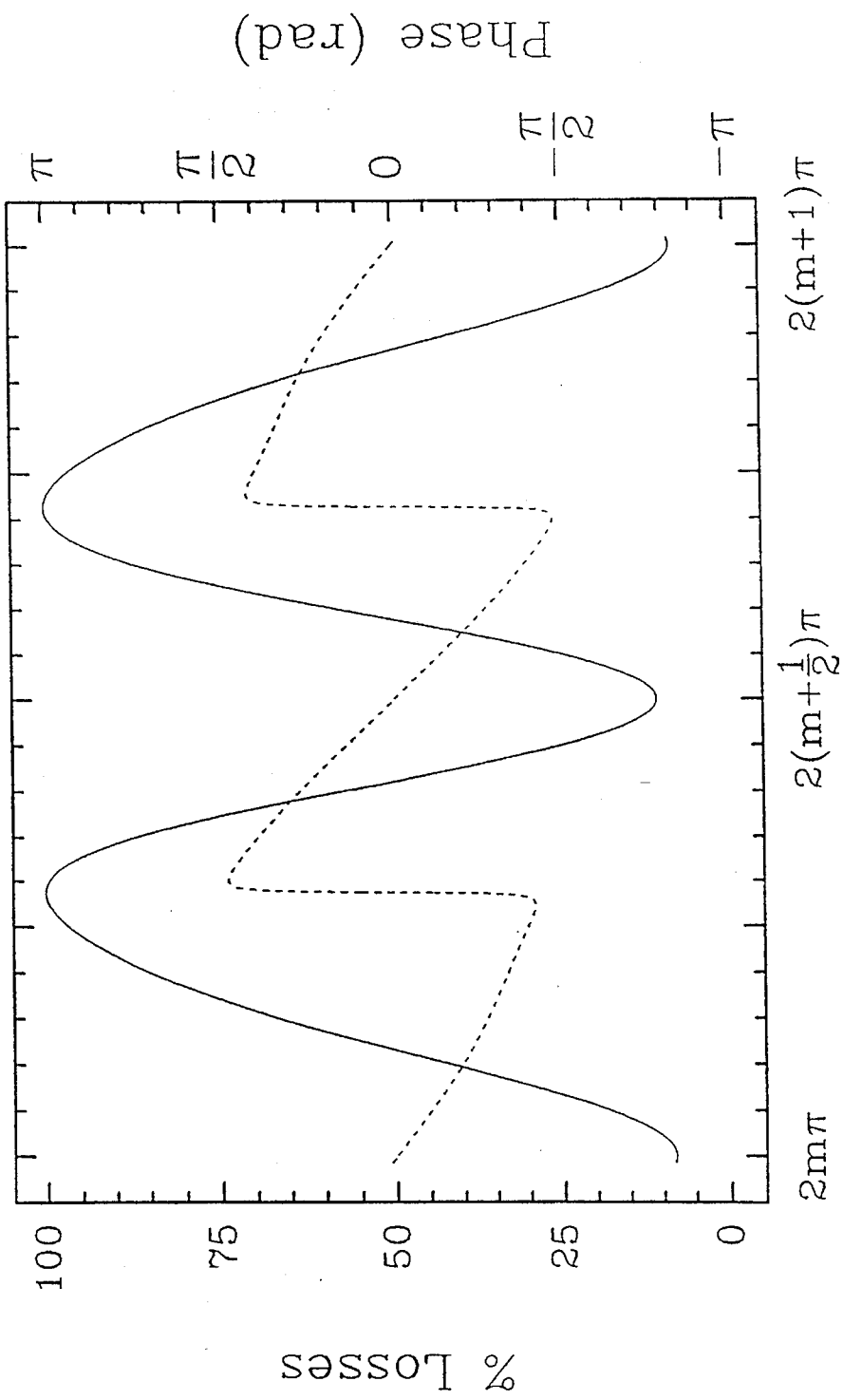
FIG. 3 is a graph of the round-trip cavity losses and net phase shift using a birefringent Michelson interferometer.

FIG. 3 illustrates the cavity losses for a Michelson resonator with a sapphire beamsplitter at 71° incidence ($r_s^2 = 0.39; r_p^2 = 0.04$). The total losses at the odd-pi phase retardations are roughly $\delta_{rt} \approx 10\%$, which substantially exceeds the available output coupling of $\delta_{oc} = r_p^2 (1 - r_s^2) \approx 2.4\%$ However, the bandwidth the crystal is more than sufficient for short pulse propagation, and also provides limited tunability. For example, a loss of less than 20% (appropriate for strong saturation in an FEL) can be achieved in a fractional bandwidth of roughly 3.2% at the m=2 order ($\alpha = 5\pi$). This bandwidth is almost 15 times wider than the transform limited spectrum of a 2 ps Gaussian pulse at 3 μm, and can be realized at that wavelength with a crystal thickness of 1.77 mm for the geometry of FIG. 2b.

In any harmonically mode locked laser containing N circulating optical pulses, the cavity modulation provides sideband coupling only among every $N^{th}$ axial mode of the resonator, yielding N sets of coupled modes (N hypermodes) which evolve independently as the laser turns on from noise. In a multi-mirror resonator which couples successive optical pulses, the evolution of interpulse phase coherence results from the forced decay of these hypermodes due to interference at the beamsplitter, relative to that hypermode with the lowest such losses, and in the presence of homogeneous gain saturation only a single hypermode ultimately dominates the spectrum. The associated axial modes are separated by the rf frequency, and the interpulse phase coherence of the pulse train is determined by the relative intensities of the surviving hypermodes.

The axial mode losses and resonant frequencies are determined from the frequency response function of the resonator. If we let 'z' denote the single-transit path length through the crystal in the Michelson resonator of FIG. 1a, and $L_1, L_2$, and $L_3$ the free-space path lengths adjacent to mirrors M1, M2, and M3 respectively, then the denominator of the response function is given by $$\text{denom} = 1 - e^{-\delta}e^{\gamma}e^{i\frac{\omega}{c} 2(L_1 + L_3 + n_o z)} \cdot M_{pp}^{int}, \quad (17)$$

where $\gamma$ and $\delta$ account for the laser gain and absorption losses, $\omega$ is the frequency, $n_o$ is the ordinary refractive index, and $M_{pp}^{int}$ is the (1,1) matrix element from Eq. (12) containing the frequency dependent phase shift $$\xi = \frac{\omega}{c} 2(n_o z + L_2 - L_1). \quad (18)$$

The resonant frequencies are then determined by the condition that the phase of the second term in Eq. (17) be an integral multiple of $2\pi$, while the axial mode losses are obtained by treating the entire second term (except for the laser gain) as a complex round-trip transmittance.

Calculations show that the axial mode losses for the $q^{th}$ hypermode (neglecting absorption) are given in general by Eqs. (12) and (13), and the corresponding phase shift $\xi$ (modulo $2\pi$) is found to be independent of $\omega_D$ and can be expressed as $$\xi = \frac{2\pi q}{N} + \phi, \quad (23)$$

where the phase shift $\phi \equiv 2\pi \cdot [2\delta L_2/\lambda]$ depends only on a residual displacement $\delta L_2$ of the second reflection mirror on the scale of an optical wavelength. The independence of $\xi$ on frequency justifies its interpretation in Eq. (12) as the net phase shift between successive, phase locked pulses: for the $q^{th}$ hypermode, the relative phase shift $\xi$ between the coupled pulses at the exit of the interferometer simply equals their relative phase difference $2\pi q/N$ at the entrance to the interferometer plus the net phase difference $\phi$ introduced by the interferometer itself.

The axial mode losses obtained from Eqs. (12) through (14) at the odd-pi phase retardations are found to be $$\delta_{rt}(\xi) = 1 - T_p^2[(1 - R_p R_s)^2 - 2T_p T_s R_s (1 - \cos \xi)], \quad (24)$$

where $R_{p,s} = r_{p,s}^2$ are the P- and S-polarized reflectances, and $T_{p,s} = 1 - R_{p,s}$ are the transmittances. Since the minimum losses are obtained for $\xi = 0$, the surviving hypermode can be selected or tuned simply by varying the phase offset $\phi$ at the secondary mirror. If the interferometer is adjusted for perfect phase locking on any of these hypermodes, then the relative growth rate $\gamma_\xi$ between the surviving hypermode ($\xi = 0$) and any other hypermode ($\xi = 2\pi/N, 4\pi/N, \ldots$) is given by $$\gamma_\xi = \frac{1 - \delta_{rt}(\xi)}{1 - \delta_{rt}(0)} = 1 - 2(1 - \cos \xi) \frac{T_p T_s R_s}{(1 - R_p R_s)^2}, \quad (25)$$

and the relative hypermode intensity after n passes is $\gamma_\xi^n$. For example, a sapphire beamsplitter at 71° incidence on the Mark III FEL ($R_s = 0.39; R_p = 0.04$; N=39 pulses) would yield relative intensities of 1, 0.11, and $10^{-4}$ for the surviving hypermode and its nearest neighbors after 366 passes. Such an optical beam would be appropriate for many applications in single mode or pulsed coherent spectroscopy.

Of importance for the manufacture and application of the birefringent beamsplitter is the specification of the alignment error in the optical c-axis. While a general misalignment can be partially compensated by rotating the beamsplitter in the plane of the crystal, a residual misalignment of the c-axis from the symmetric orientations of FIG. 2 will lead to irreducible birefringent losses at the design wavelength. The most general misalignment, with the c-axis represented by the unit vector $\hat{c}_e$, can be included in the previous analyses by introducing separate matrices $M_1$ and $M_2$ for the primary and secondary beams in the crystal, $$M_{1,2} = \begin{bmatrix} (\cos^2\psi_{1,2} + e^{-i\alpha_{1,2}}\sin^2\psi_{1,2}) & -\cos\psi_{1,2}\sin\psi_{1,2}(1-e^{-i\alpha_{1,2}}) \\ -\cos\psi_{1,2}\sin\psi_{1,2}(1-e^{-i\alpha_{1,2}}) & (\sin^2\psi_{1,2} + e^{-i\alpha_{1,2}}\cos^2\psi_{1,2}) \end{bmatrix}, \quad (26)$$

where the angle $\psi_1$ between the (horizontal) input polarization and the (tilted) ordinary polarization of the primary beam is given through a generalization of Eq. (2) by $$\psi_1 = \arc\cos|(\widehat{k_1 \times \hat{c}_e}) \cdot \hat{e}_1|. \quad (27)$$

This angle must be distinguished from the corresponding angle $\psi_2$ for the secondary beam due to the asymmetry introduced by the misaligned unit vector $\hat{c}_e$. Similarly, the phase retardation a defined in Eq. (9) must be distinguished between the two beams due to the vector dependence of Eq. (11).

Figure 4:
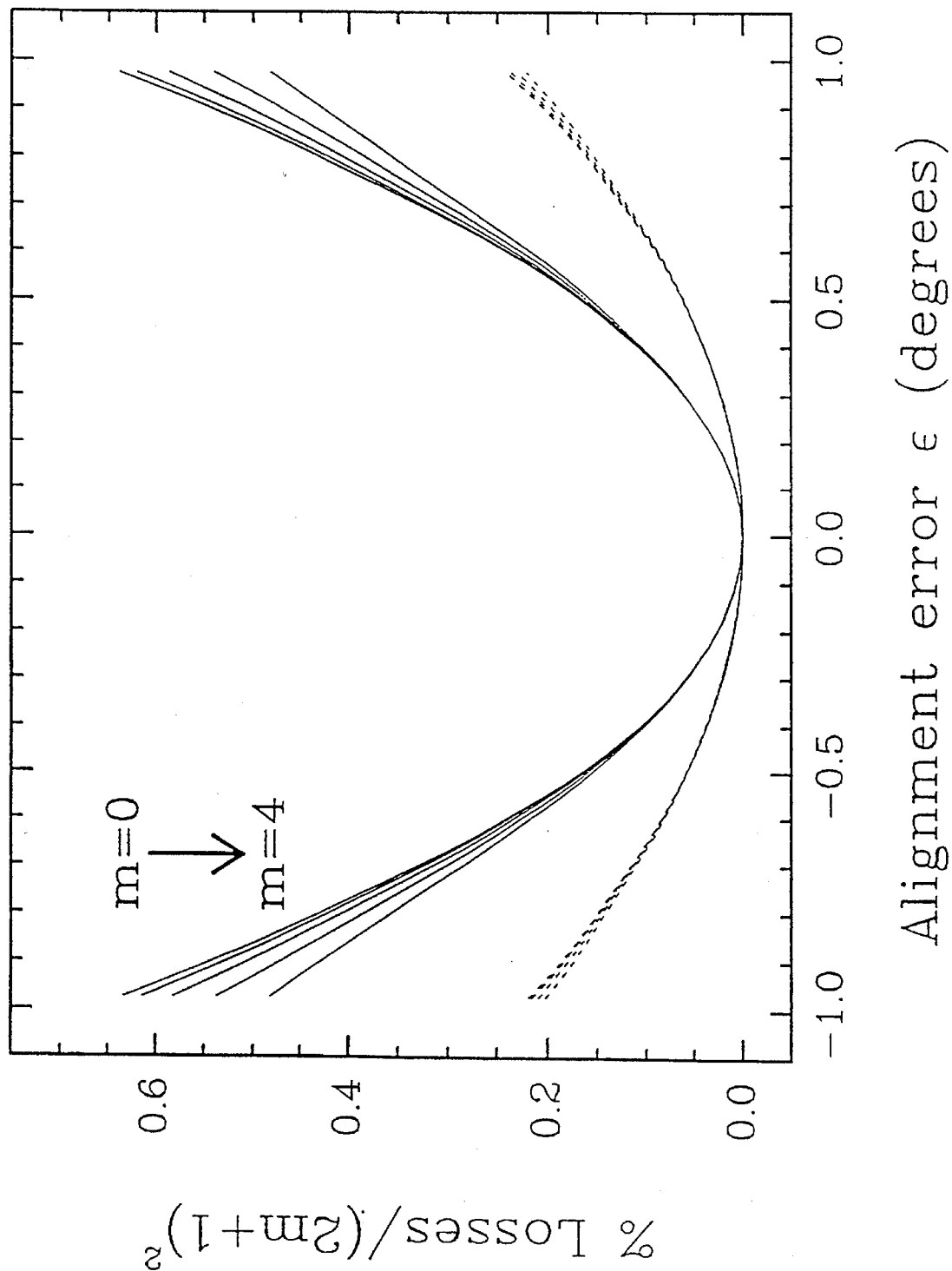
FIG. 4 shows extra cavity losses at an odd-pi phase retardations due to residual misalignment of the optical c-axis in a Michelson resonator.

As noted, a general misalignment of the c-axis can be partially compensated by rotating the beamsplitter in the plane of the crystal. However, a finite angle $\epsilon$ between the surface and the c-axis in FIG. 2a, or a small deviation $\epsilon$ of the c-axis from the correct angle $\theta_2$ in FIG. 2b, represent residual misalignments that cannot be compensated this way. FIG. 4 plots the extra cavity losses at the odd-pi phase retardations as a function of the residual misalignment $\epsilon$, for a sapphire beamsplitter at 71° in each of the configurations of FIG. 2 (the shape and magnitude of these curves are essentially independent of the angle of incidence.) We see that the losses in each case are roughly proportional to both $\epsilon^2$ and $\alpha^2$, but that the geometry of FIG. 2b is much more sensitive to these parameters. Nevertheless, misalignments as large as 0.5° in either geometry yield only a few percent extra losses even at the m=2 order, which would be acceptable in most high gain laser systems. For such systems, FIG. 4 further indicates that typical beam divergence angles of several millirad can be neglected, and that a small vertical wedge of several minutes, deliberately ground into the crystal, can also be tolerated; such a wedge would be appropriate for separating the beamsplitter leakage from the outcoupled radiation in the far field.

Design and analysis of the birefringent Fox-Smith resonator

The Fox-Smith resonator provides an alternate method of phase locking the optical pulses in an harmonically mode locked laser; its construction using a birefringent beamsplitter is illustrated in FIG. 1b. The Fox-Smith resonator differs fundamentally from the Michelson resonator in that the bandpass of the interferometer can in principle be made arbitrarily narrow by increasing the reflectance of the beamsplitter, thereby enhancing the mode selectivity and phase locking efficiency (in contrast, the losses in the Michelson interferometer vary sinusoidally with frequency for any value of the reflectance, as indicated by the $\epsilon$-dependence in Eq. (24).) Since the circulating intensity in the Fox-Smith interferometer is always greater than the intensity in the laser cavity, the birefringent beamsplitter offers a definite advantage over coated beamsplitters in high power Fox-Smith lasers.

In tunable lasers such as the free-electron laser, the birefringent Fox-Smith resonator offers a second important advantage over the Michelson resonator which exploits the fact that, in contrast to the latter configuration, the birefringent medium is not contained within the interferometer proper. Because of this feature, the constraint on the direction of the optical c-axis (which must satisfy reflection symmetry in the Michelson resonator) can actually be relaxed to provide extremely broadband tunability. As shown below, this tunability can be realized by rotating the beamsplitter in the plane of the crystal without compromising the alignment of the interferometer.

The cavity losses in the birefringent Fox-Smith resonator are calculated using the Jones matrix calculus according to the same definition as in the Michelson resonator, except we assume from the start an arbitrary alignment of the optical c-axis. With the surface reflection and transmission matrices r(r') and t(t') defined in Eqs. (16), and the birefringent retardation matrix $M_1$ given by Eqs. (26) and (27) for the arbitrarily aligned crystal, the Jones matrix for a single reflection from the Fox-Smith interferometer can be written $$M^{int} = t'M_1 t(\ldots + e^{2i\xi}r^4 + e^{i\xi}r^2 + 1)t'M_1 t, \quad (28)$$

where $\xi$ accounts for the relative phase shift between successive pulses at the beamsplitter after a single round trip in the interferometer. Note that the series of terms in parentheses represent multiple reflections of the optical pulses within the interferometer (assuming perfectly reflecting cavity mirrors), but that multiple reflections within the beamsplitter itself have again been neglected due to the large angle of incidence. For a phase locked optical beam with $\xi=0$, an explicit evaluation of the (1,1) matrix element (to within an overall phase factor) then yields $$M_{pp}^{int} = t_p t_p' (\cos^2 \psi_1 + e^{-2i\alpha_1} \sin^2 \psi_1), \quad (29)$$

which is independent of the S-polarized reflectance of the crystal.

For alignments of the optical c-axis corresponding to $\psi_1 = \pm \pi/4$, in which cases the odd-pi phase retardations yield perfect S-polarization in the interfetemeter, the interferometer losses $\delta_{rt} = 1 - |M_{pp}^{int}|^2$ and phase shift $\phi_{pp} = \arg(M_{pp}^{int})$ are given by $$\delta_{rt}(\alpha_1) = \sin^2 \alpha_1 + (2r_p^2 - r_p^4)\cos^2 \alpha_1 \quad (30)$$

and $$\phi_{pp}(\alpha_1) = -\alpha_1 \quad (31)$$

Figure 5:
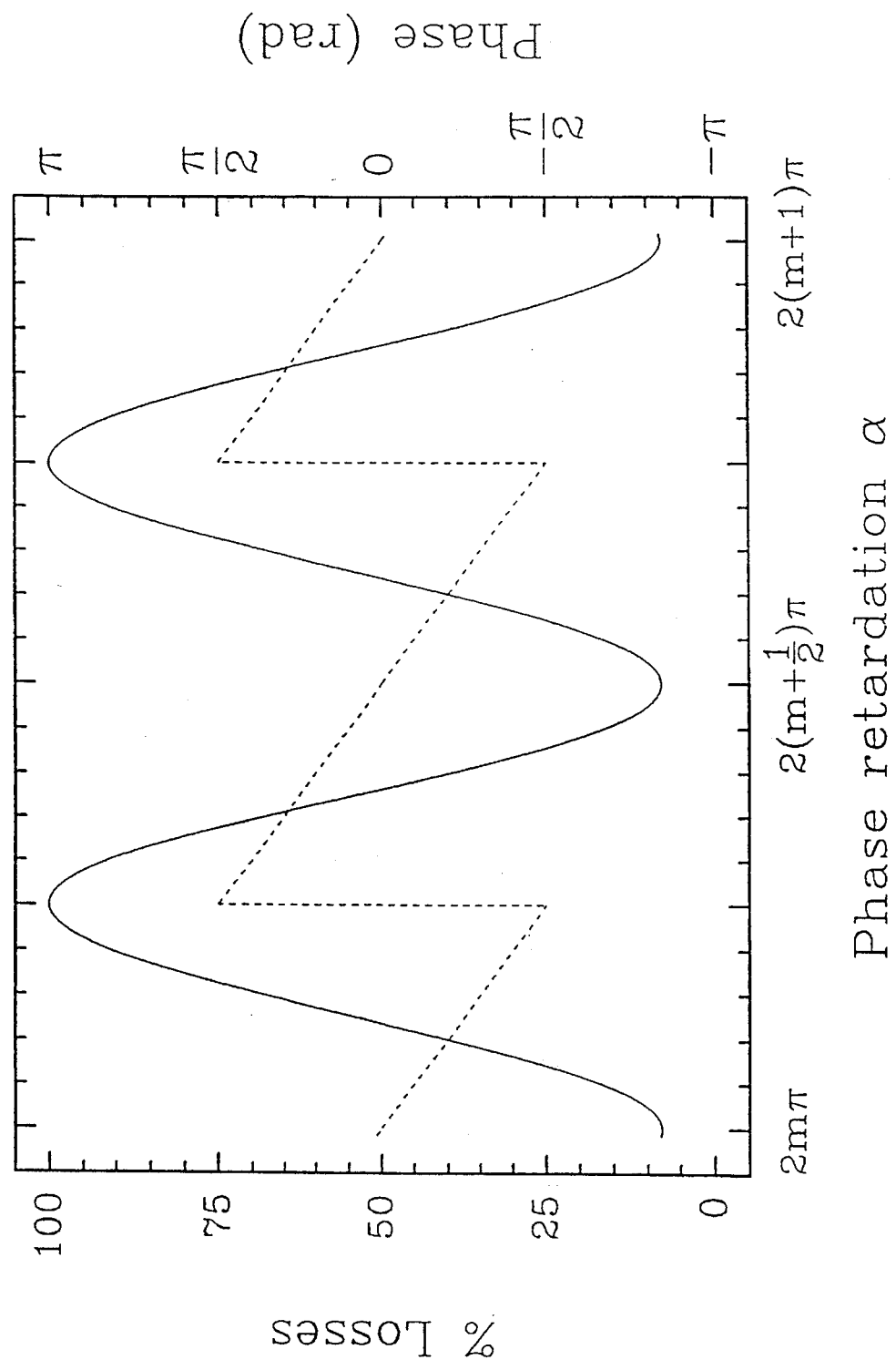
FIG. 5 shows the round-trip cavity losses and net phase shift in a birefringent Fox-Smith interferometer.

These curves are illustrated in FIG. 5 for a sapphire beamsplitter at 71° incidence ($r_p^2 = 0.04$), and can be compared with the corresponding curves from FIG. 3 for the Michelson resonator. The Fox-Smith resonator has a wider bandwidth and lower losses at the odd-pi phase retardations because, in contrast to the Michelson resonator, the interferometer does not contain the birefringent medium and the associated lossy interface. For total losses less than 20%, the fractional bandwidth is roughly 4.7% at the m=2 order ($\alpha = 5\pi$), which is 50% wider than the corresponding bandwidth in the Michelson resonator. The output coupling in this example is also 60% greater than the output coupling in the Michelson resonator, because the beam does not suffer an extra S-polarized transmission.

Although the birefringent Fox-Smith resonator with $\psi_1 = \pm \pi/4$ exhibits a wider bandwidth than the Michelson resonator, broadband tunability is achieved by allowing $\psi_1$ to vary. Indeed, from the (1,1) matrix element in Eq. (29) and the definition of the cavity losses in Eq. (13), we observe the remarkable property that the cavity losses at the integral-pi phase retardations are independent of the alignment of the optical c-axis (i.e. independent of $\psi_1$). These losses are a minimum and are given by $$\delta_{rt}^{min} = 2r_p^2 - r_p^4, \quad (32)$$

and result only from the P-polarized reflections at the outcoupling surface of the beamsplitter. It is this restriction to integral- (specifically to odd-) pi phase retardations that provides broadband tunability: as the direction of the c-axis is changed, the extraordinary refractive index also changes due to the vector dependence of Eqs. (10) and (11), and therefore, so does the wavelength corresponding to a given order m of the phase retardation.

As noted previously, the alignment of the c-axis can be varied without affecting the alignment of the interferometer simply by rotating the beamsplitter in the plane of the crystal until the losses are minimized at the operating wavelength. For the orientation of FIG. 2a in which the c-axis is parallel to the surface of the crystal, the appropriate degree of freedom is provided by the angle $\theta_1$, whereas in FIG. 2b it is provided by a rotation through an angle $\rho$ about the y-axis. With $\theta_1=0$ for $\hat{c}=\hat{x}$, and $\rho=0$ for the reflection-symmetric orientation, the wavelengths which minimize the losses in the two configurations are given as functions of the respective angles by $$\lambda(\theta_1) = 2\Delta n \left( \frac{t_c}{2m+1} \right) \left[ \frac{1 - \sin^2\phi \cos^2\theta_1}{\cos\phi} \right] \quad (33)$$

and $$\lambda(\rho) = \quad (34)$$

$$2\Delta n \left( \frac{t_c}{2m+1} \right) \left[ \frac{1 - (\cos\phi\cos\theta_2 - \sin\phi\sin\theta_2\sin\rho)^2}{\cos\phi} \right].$$

These equations were obtained from Eqs. (9)–(11) under the approximation $\Delta n \equiv n_o - n_e \ll n_o$, where m is the order of phase retardation, $\phi$ is the internal angle of refraction, and $\theta_2$ is the optimum solution from Eq. (8).

The tuning range in each configuration is extremely large. For example, in the first configuration, a 1.02 mm thick sapphire beamsplitter at 71° incidence can be tuned on the m=2 order from 2.55 µm to 3.65 µm as $\theta_1$ is rotated from 5° to 85°, which represents a 35% tuning range. In the second configuration, a 1.77 mm thick beamsplitter at 71° can be tuned on the m=2 order across the entire transmissive range of sapphire as $\rho$ is rotated from −85° to +85°! The immense tuning range in the second case evidently results from the intrinsically small birefringence, and the extreme sensitivity of that birefringence to misalignment, for wave vectors lying close to the c-axis.

The trade-off for achieving broadband tunability in the Fox-Smith resonator lies in the interpulse coupling and phase locking efficiency. At the odd-pi phase retardations, the beamsplitter acts like a half-wave plate that simply rotates the incident horizontal polarization by some angle to maintain linear polarization in the interferometer. However, if the c-axis is not optimally aligned the angle of rotation will be less than 90°. In such cases, the phase locking efficiency is reduced because the interpulse coupling is not provided by a purely S-polarized reflectance. Fortunately, the increased coupling provided by the multiple reflections tends to compensate (even dominate) this effect.

The derivation of the axial mode structure in the Fox-Smith resonator can be carried out in a similar fashion to the Michelson analysis. If successive pulses are perfectly overlapped at the beamsplitter then the relative phase shift $\xi$ for the $q^{th}$ hypermode is given by Eq. (23), and the relative hypermode growth rates $\gamma_\xi$ for the arbitrarily aligned crystal, obtained from Eqs. (28) and (13) at the odd-pi phase retardations according to the definition in Eq. (25), are given to first order in the small quantity $(1-\cos\xi)$ by $$\gamma_\xi = 1 - 2(1 - \cos\xi) \left[ \left( \frac{1}{T_s^2} + \frac{1}{T_p^2} \right) - \quad (35)\right.$$

$$\left. \left( \frac{-s^2}{T_s} + c^2 T_p \right) - \left( c^2 T_s + \frac{s^2}{T_p} \right)^2 \right],$$

where c and s are shorthand notations for cos ($2\psi_1$) and sin ($2\psi_1$), and $T_{s,p}$ are the S- and P-polarized transmittances of the beamsplitter surface. If the crystal is optimally aligned, then the complete $\xi$-dependence of $\gamma_\xi$ is given by $$\gamma_\xi \left( \psi_1 = \frac{\pi}{4} \right) = \frac{T_s^2}{T_s^2 + 2R_s(1 - \cos\xi)}, \quad (36)$$

which is also the result for the non-birefringent Fox-Smith resonator.

Figure 6:
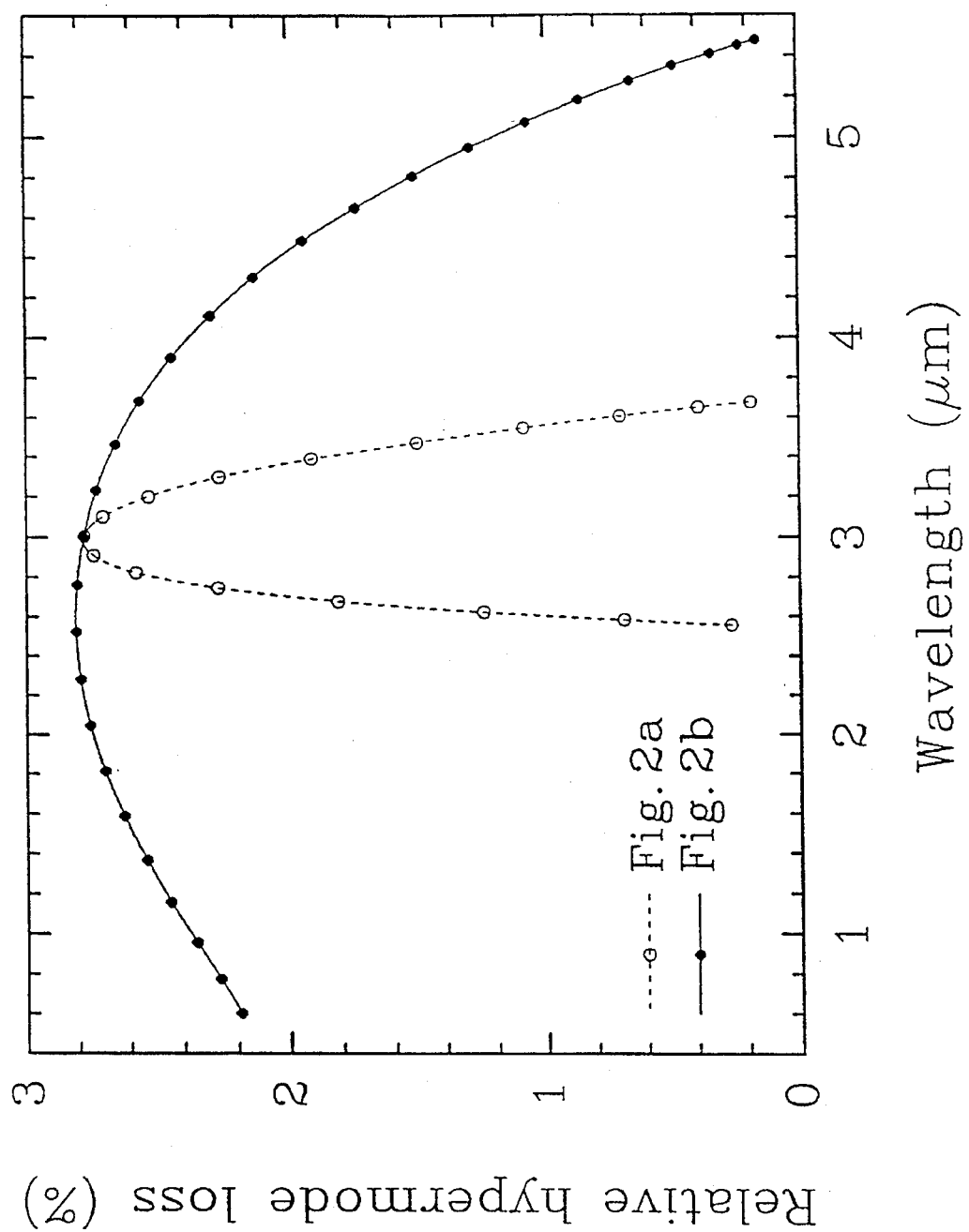
FIG. 6 shows the relative first order hypermode losses in a Fox-Smith interferometer for the crystal orientations of FIGS. 2a, 2b.

The $\psi_1$-dependence of Eq. (35) is independent of the method by which the optical c-axis is misaligned, but different schemes will of course yield different wavelengths at the odd-pi phase retardations. For the crystal orientations of FIG. 2, the angles $\psi_1$ are given from Eq. (27) by $$\psi_1(\theta_1) = \arccos \frac{1}{\sqrt{1 + \cos^2\phi \cot^2\theta_1}} \quad (37)$$

and $$\psi_1(\rho) = \quad (38)$$

$$\arccos \frac{\cos\rho}{\sqrt{\cos^2\rho + (\sin\phi\cot\theta_2 + \cos\phi\sin\rho)^2}},$$

where $\theta_1$ and $\rho$ are the respective rotational angles about the surface normals, and $\theta_2$ is the optimum solution from Eq. (8). FIG. 6 illustrates the relative loss $\delta_\xi \equiv 1-\gamma_\xi$ of the first order hypermode ($\xi=2\pi/N$) across the tuning range for each of these configurations ($\alpha_1=5\pi$). The curves were generated parametrically by varying $\theta_1$ and $\rho$, with each dot in the figure representing 5° of rotation, for a sapphire beamsplitter at 71° incidence on the Mark III FEL ($T_s$=0.61; $T_p$=0.96; N= 39 pulses). Since the angle of incidence was held fixed, the corresponding wavelengths from Eqs. (33) and (34) were computed self-consistently with the angle of refraction $\phi$ by including the wavelength dependence of $\phi$ from Snell's law.

We see that the configuration of FIG. 2b yields a larger loss over a wider wavelength range than the configuration of FIG. 2a. For example, a rotation of only ±22° in the former case covers the range from 2 to 4 µm (the useful range of sapphire in the Mark III FEL) with first order hypermode losses of at least 2.4%; the corresponding relative hypermode intensity is less than $2(10^{-4})$ After 366 passes (5 µs). Evidently, the small rotations of the beamsplitter which yield broadband tunability in this case also yield nearly vertical polarization in the interferometer, so the reflectance stays mostly S-polarized. Indeed, the polarization inclination $2\psi_1$ varies from only 72° at 2 µm to 110° at 4 µm, while the angle between the $\hat{k}$ vector and the c-axis varies from 34° to 52°, yielding large changes in the extraordinary refractive index. Design and analysis of the birefringent crossed-beam autocorrelator Autocorrelation techniques for the measurement of ultrashort optical pulses have been established now for several decades (see, for example, S. L. Shapiro, ed., *Ultrashort Light Pulses: Picosecond Techniques and Applications,* Springer-Verlag, Berlin, Chapter 3.) The incorporation of the birefringent beamsplitter in an optical autocorrelator, as one example of an extracavity application of the present invention, would be appropriate for instruments requiring broadband capability, or for high power incident beams that could potentially damage an optical coating. The application of the birefringent beamsplitter in a crossed-beam autocorrelator utilizing Type II second harmonic generation is shown in FIG. 7.

The birefringent beamsplitter provides several specific benefits for the crossed-beam autocorrelation technique. First, the absence of a thin-film coating-precludes any temporal distortion of the optical pulses at the beamsplitting surface. Second, the birefringence precludes any second harmonic generation at the doubling crystal from each of the two beams separately, even when the pulses do not coincide in time. In conventional autocorrelators which rely upon the same polarization for each beam, this 'single-beam doubling' can produce a substantial background signal in the autocorrelation trace, especially at the shallow crossed-beam angles required for high temporal resolution. The absence of single-beam doubling in the birefringent autocorrelator is due to two effects: 1) since the two incident beams at the second harmonic crystal are orthogonally polarized, this crystal must be cut for Type II phase matching in order to produce an autocorrelation signal when the two orthogonally polarized pulses are overlapped in time. This requirement of Type II phase matching then precludes any single-beam doubling, because two photons from each individual beam have the same polarization and so would not be phase matched; 2) in many harmonic generation crystals, a crystal orientation which optimizes the effective nonlinear coefficient for Type II phase matching produces a zero nonlinear coefficient for Type I phase matching. Therefore, even the beams were individually phase matched, the nonlinear conversion in such crystals would be zero!

Figures 7, 7A, 7B:
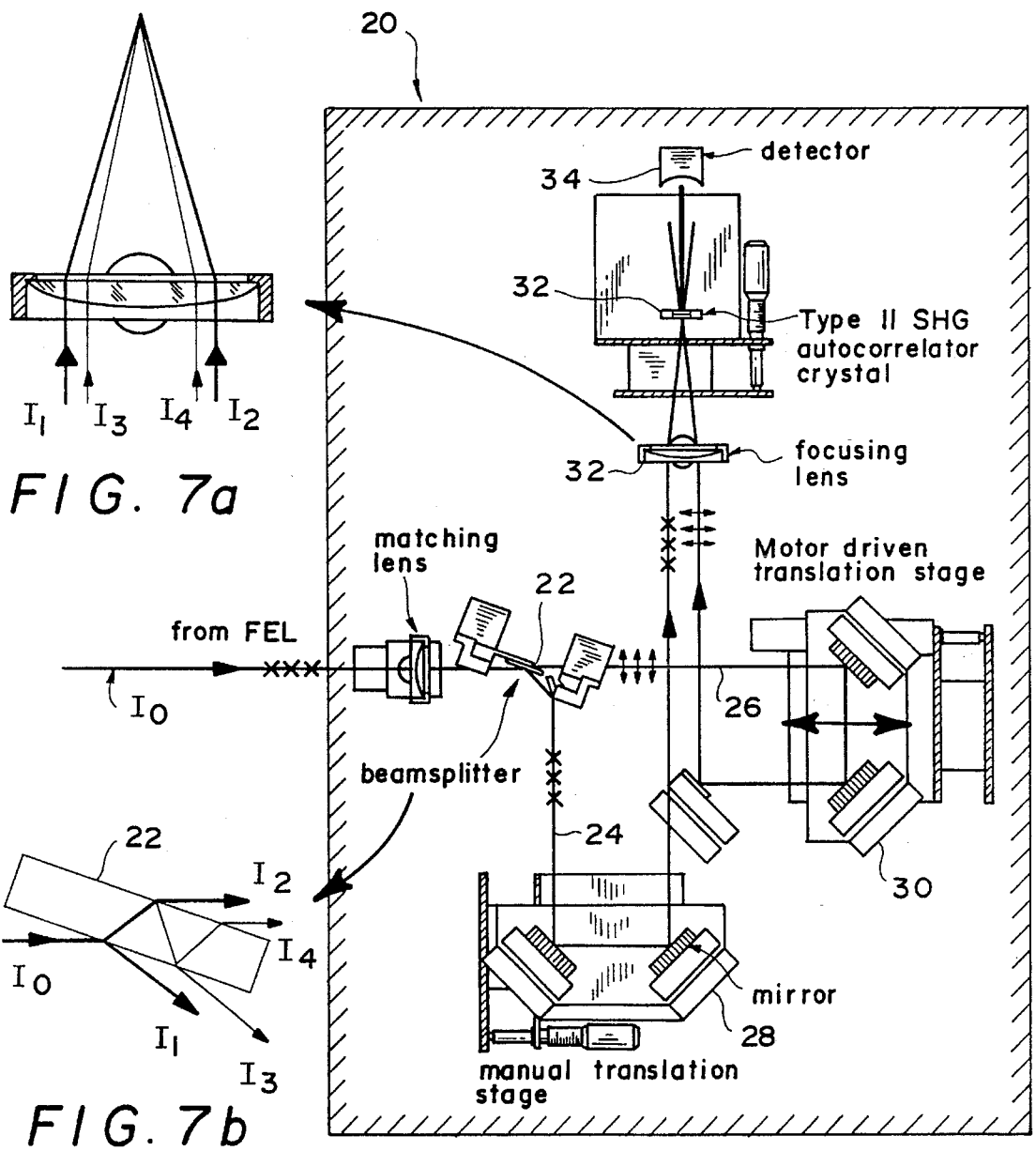
FIGS. 7, 7a and 7b show the incorporation of the birefringent beamsplitter in a crossed-beam optical autocorrelator.

To analyse the birefringent crossed-beam autocorrelator, we identify the incident, reflected, and transmitted beams shown in FIG. 7 by the respective intensities $I_0$, $I_1$, $I_2$, $I_3$, and $I_4$. Since the incident beam $I_0$ is polarized perpendicular to the plane of incidence (S-polarized), the front surface of the crystal acts as the beamsplitting surface. The birefringence is then exploited to yield P-polarized light at the back surface which, for angles of incidence near the Brewster angle, is transmitted with negligible reflective losses. However, note that since tunability is achieved by perturbing the orientation of the beamsplitter, the transmitted beams $I_2$ and $I_4$ and the reflected beam $I_3$ will in general all have some mixture of both polarizations.

The second harmonic intensity is proportional to the product of the incident intensities at the surface of the doubling crystal, and so the intensity products that contribute to an autocorrelation signal are as follows:

Primary autocorrelation: $I_1^{vert} \cdot I_2^{horz}$ (39)

Secondary autocorrelations: $I_3^{vert} \cdot I_4^{horz}$ and $I_4^{vert} \cdot I_3^{horz}$ where the superscripts refer to the polarization components in each beam. For a unity input Jones vector $[E_p\ E_s]^T = [0\ 1]^T$ projected onto the P- and S-polarized components, the Jones vectors for the beams $I_1$, $I_2$, $I_3$, and $I_4$ are then obtained upon multiplication by the following matrices:

Beam $I_1$: $r$

Beam $I_2$: $t'M_1 t$

Beam $I_3$: $t'M_2 r'M_1 t$ (40)

Beam $I_4$: $t'M_1 r'M_2 r'M_1 t$ where the Fresnel reflection and transmission coefficients enter via $$r = \begin{bmatrix} r_p & 0 \\ 0 & r_s \end{bmatrix}; r' = \begin{bmatrix} r_p' & 0 \\ 0 & r_s' \end{bmatrix}; t = \begin{bmatrix} t_p & 0 \\ 0 & t_s \end{bmatrix}; t' = \begin{bmatrix} t_p' & 0 \\ 0 & t_s' \end{bmatrix}, \quad (41)$$

and $$M_{1,2} = \quad (42)$$

$$\begin{bmatrix} (\cos^2\psi_{1,2} + e^{-i\alpha_{1,2}}\sin^2\psi_{1,2}) & -\cos\psi_{1,2}\sin\psi_{1,2}(1 - e^{-i\alpha_{1,2}}) \\ -\cos\psi_{1,2}\sin\psi_{1,2}(1 - e^{-i\alpha_{1,2}}) & (\sin^2\psi_{1,2} + e^{-i\alpha_{1,2}}\cos^2\psi_{1,2}) \end{bmatrix},$$

$$\alpha_{1,2} = 2\pi[n_o - n_e(\theta_{1,2})]\frac{t_c}{\lambda\cos\phi}, \quad (43)$$

$$\alpha_{1,2} = 2\pi[n_o - n_e(\theta_{1,2})]\frac{t_c}{\lambda\cos\phi}, \quad (44)$$

$$\theta_{1,2} = \arccos[\hat{k}_{1,2} \cdot \hat{c}]. \quad (45)$$

If the birefringent beamsplitter is oriented in the geometry of FIG. 2b, then the relevant unit vectors, including an arbitrary rotation through an angle $\rho$ about the surface normal, are $$\hat{e}_1 = \cos\phi\hat{x} + \sin\phi\hat{y}, \quad (46)$$

$$\hat{k}_1 = -\sin\phi\hat{x} + \cos\phi\hat{y}, \quad (47)$$

and $$\hat{c} = \sin\theta_2 \sin\rho\hat{x} + \cos\theta_2 \hat{y} + \sin\theta_2 \cos\rho\hat{z} \quad (48)$$

where $\phi$ is again the internal angle of refraction, and the unit vectors $\hat{e}_2$ and $\hat{k}_2$ are obtained by replacing $\phi \to \pi - \phi$. Note that, for the primary autocorrelation product, the goal is to rotate as much of the incident S-polarization into P-polarization at the back surface as possible, and this will always be accomplished at the odd-pi phase retardations. This simplifies the form of matrix $M_1$. However, the phase retardation in matrix $M_2$ must then be calculated at the wavelength for which the odd-pi phase retardation is obtained on the first beam; for arbitrary rotations of the beamsplitter, the phase retardation $\alpha_2$ will generally differ slightly from an odd multiple of pi.

Figure 8:
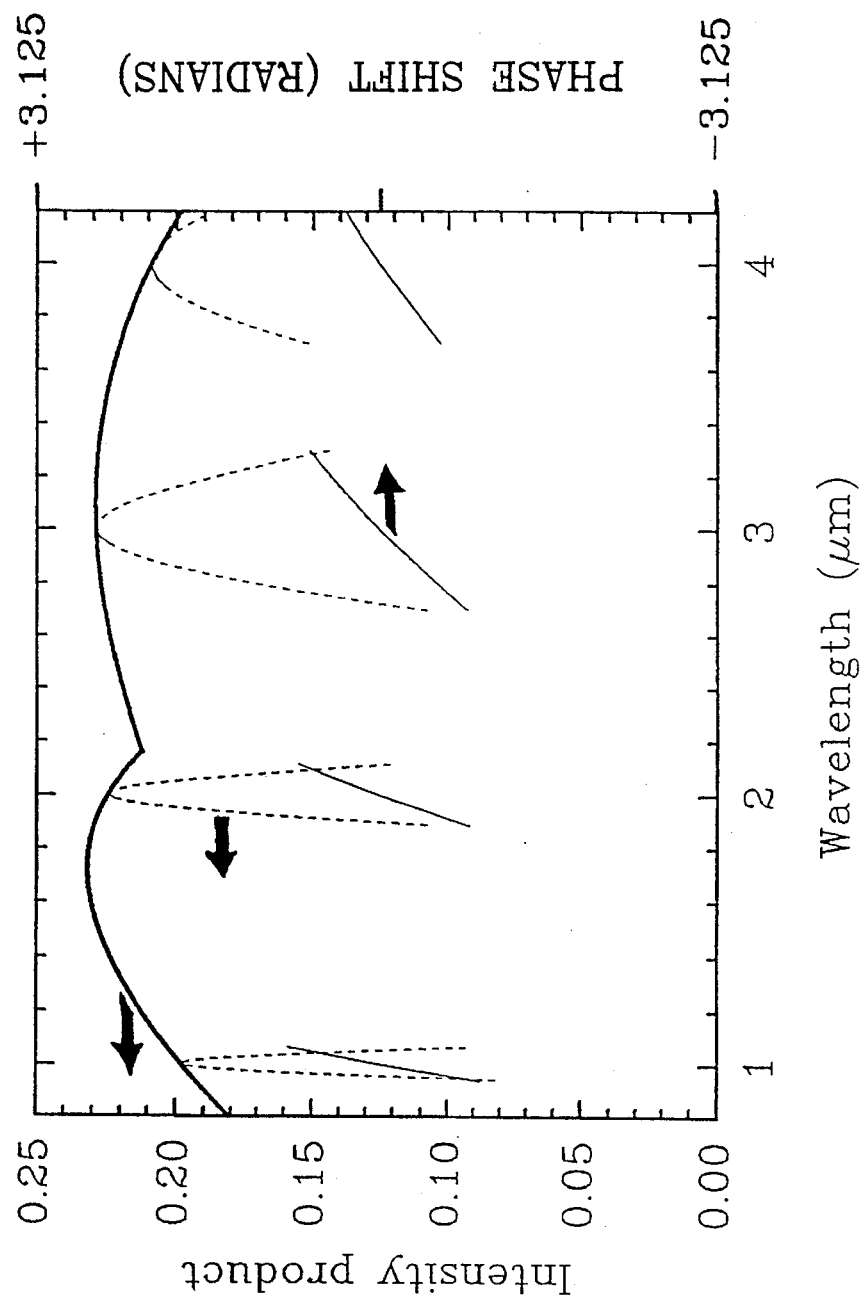
FIG. 8 is a graph illustrating the tunability of the autocorrelator of FIG. 7.

As indicated, tuning is accomplished by rotating the beamsplitter by an angle $\rho$. For the $m^{th}$ order of phase retardation (i.e. $\alpha_1 = [2m+1]\pi$), the corresponding operating wavelengths are given by Eq. (34), and the angle of inclination $\psi_1$ is given by Eq. (38); these results were also obtained above for the Fox-Smith interferometer. The primary S-polarized reflectance and P-polarized transmittance for the beamsplitter can now be calculated using the first two matrix products from Eqs. (40), and the resulting contribution to the primary autocorrelation product can be found from Eq. (39). The results are displayed in FIG. 8, in which the primary autocorrelation product is shown in bold. The wavelengths between 1 μm and 2.2 μm are accessible by operation on the $9\pi$ phase retardation for rotation angles $\rho$ between $-26°$ and $+19°$, and wavelengths between 2.2 μm and 4 μm are accessible on the $5\pi$ phase retardation for the same range of rotation angles $\rho$. We see that the resulting intensity product is greater than 0.2 for all of these wavelengths, which compares favorably with an ideal maximum product of 0.25 which would be obtained with a 50% beamsplitter. The secondary autocorrelation products from Eq. (39) are also included in FIG. 8; they do not show up at all on the scale of that graph. At a given operating wavelength corresponding to a given value of the rotation angle $\rho$, the bandwidths are also very broad; these are shown as dashed lines at wavelengths of 1 μm, 2 μm, 3 μm, and 4 μm. How broad is broad? From numerical pulse propagation calculations, we find that the complex transmittance at each passband (with magnitude given by the dashed lines and phase shift given by the solid lines) induces negligible broadening in optical pulses even as short as 100 fs in duration. At 3 µm, 100 fs corresponds to only 10 cycles of light.

PREFERRED EMBODIMENTS OF THE INVENTION

The present invention comprises an uncoated, birefringent beamsplitter for high power lasers and laser applications. The embodiments described in this Section generally pertain, but are not limited, to intracavity interferometers for high power lasers, in which the output coupling is provided at one of the surfaces by P-polarized reflection near the Brewster angle, and axial mode selection is enforced at the other surface by S-polarized reflection at the same angle of incidence, or to extracavity devices such as optical autocorrelators, in which an uncoated beamsplitter is required to provide roughly the same power into each of the outgoing beams from the beamsplitter. Justification for some of the embodiments described below is provided experimentally by the successful application of a sapphire birefringent beamsplitter in a Michelson resonator on the Mark III free-electron laser, which was used to phase lock the adjacent optical pulses in that laser.

Materials for the Birefringent Beamsplitter

As noted above in the Detailed Description, the birefringent beamsplitter can in practice be constructed of any suitable material with an arbitrary degree of birefringence. However, weakly birefringent materials provide the most efficient and practical designs, because they require thicker crystals which are easier to fabricate with precision. For UV, visible, and near-IR lasers, the preferred material is sapphire or fused silica, which both have roughly the same weak birefringence ($n_o - n_e \approx 0.0075$ for sapphire, $n_o - n_e \approx 0.0095$ for silica). Silica is much less absorptive at wavelengths near 0.25 µm and shorter. However, sapphire has a higher refractive index than silica ($n_o \approx 1.76$ compared to $n_o \approx 1.53$ at 1 µm) and so provides substantially greater reflectance near the Brewster angle. A quantitative comparison of the S-polarized reflectance can be made at the respective angles of incidence for which the P-polarized reflectance is 5% at 1 µm: in sapphire, the corresponding angle of incidence is 72.4° and the S-polarized beamsplitter reflectance is 43.6%. In silica, the corresponding angle of incidence is 71.0° but the S-polarized beamsplitter reflectance is only 32.9%. Materials with a higher refractive index will provide an even larger reflectance. If the restriction to weak birefringence is relaxed, for example, then an appropriate material for visible or infrared applications could be lithium niobate, which has $n_o - n_e = 0.077$ and $n_o \approx 2.24$ at 1 µm. In this case, an S-polarized reflectance of 50% (which is the optimum value in most beamsplitter applications) is obtained at an angle of incidence of 69.6°, but yields only 0.6% reflective losses at the P-polarized surface In materials which also have a finite nonlinear coefficient for harmonic generation, this coefficient can be minimized or eliminated by a suitable orientation of the a- and b-axes of the crystal without affecting the orientation of the c-axis which governs the operation of the beamsplitter.

Geometry of the Crystal Axes

In some applications of the birefringent beamsplitter, such as the Fox-Smith resonator or the birefringent autocorrelator, the constraint that the phase retardation be an odd-integral multiple of pi applies only to one of the internal beam paths within the crystal. In such cases, the c-axis can lie anywhere in a plane which contains the wave vector $\hat{k}$ and is tilted at 45° to the input polarization $\hat{e}$. However, if the constraint on phase retardation applies to two or more internally reflected beam paths in the crystal, such as in the Michelson resonator, then the orientation of the c-axis is also constrained by reflection symmetry to only two directions within that plane, one lying parallel to the surface of the crystal, the other possessing a projection onto the plane of incidence which is perpendicular to the surface of the crystal. This symmetry can only be realized for uniaxial crystals, and therefore these crystals are the preferred (indeed, required) embodiment for such applications.

In general, uniaxial crystals are the preferred embodiment for any application of the birefringent beamsplitter, because they provide greater ease in the design and fabrication of the optic. However, this restriction need not apply in all cases; if the constraint on phase retardation applies to only one internal beam path in the crystal, then biaxial crystals could also be chosen to satisfy the design criteria, thereby extending the choice of appropriate materials in certain applications.

In all designs employing uniaxial crystals, the two preferred orientations of the optical ĉ-axis are the ones shown in FIG. 2, in which the ĉ-axis lies in the plane of the crystal, or the ĉ-axis possesses a projection onto the plane of incidence which is perpendicular to the surface of the crystal. If the ĉ-axis is parallel to the surface of the crystal, resonator designs with significantly different angles of incidence can be realized simply by rotating the beamsplitter in the plane of the crystal; on the other hand, the geometry of FIG. 2b is intrinsically more tunable, and allows a given order m of the phase retardation to be realized with a thicker crystal, which again eases the fabrication process.

Applications to Interferometric Resonators

The preferred embodiment for the birefringent beamsplitter in a multi-mirror resonator is the birefringent Fox-Smith interferometer shown in FIG. 1b, employing a sapphire beamsplitter at 71° incidence, with substantial output coupling provided by the P-polarized interface. The Fox-Smith resonator exhibits a wide enough bandwidth to accommodate even sub-picosecond pulse propagation, and is superior to the Michelson resonator for phase locking an rf linac free-electron laser. The Fox-Smith resonator is also superior to the latter resonator for mode selection in multi-mirror lasers in general. Furthermore, because the crystal orientation is not restricted by reflection symmetry, extremely broadband tunability can be realized by rotating the beamsplitter in the plane of the crystal without affecting the alignment of the interferometer. In such applications, the beamsplitter would preferably be polished with a slight, vertical wedge angle between the front and back surfaces (no more than a few arc-minutes). Such a wedge angle would not perturb the operation of the beamsplitter, but it would be appropriate for separating the beamsplitter leakage from the outcoupled radiation in the far field.

Applications to Optical Autocorrelation

The preferred embodiment of the birefringent beamsplitter in the crossed-beam autocorrelator is a sapphire beamsplitter inclined at 71° incidence, with the optical c-axis possessing a projection onto the plane of incidence which is perpendicular to the surface of the crystal. In such application, the incident beam is polarized perpendicular to the plane of incidence (S-polarized), so that the beamsplitting surface is the front surface and the transmitted beam is P-polarized. The beamsplitter is mounted in such a manner (described below) that it can be rotated through a ±27° range of angles about an axis perpendicular to the surface of the crystal. Such rotation provides tunability of the beamsplitter on multiple orders of the phase retardation. The preferred autocorrelation technique is based on Second harmonic generation employing a non-linear crystal with Type II phase matching; for wavelengths between 2.9 μm and 4.2 μm, an appropriate crystal is silver gallium sulfide (AgGaS$_2$) with a phase matching angle of 59°. All of the above wavelengths can be phase matched either by angle tuning the crystal, or by changing the crossed-beam angle by means of the manual translation stage (in which case the longitudinal time of flight between the beamsplitter and the crystal is not affected).

Figure 9B:
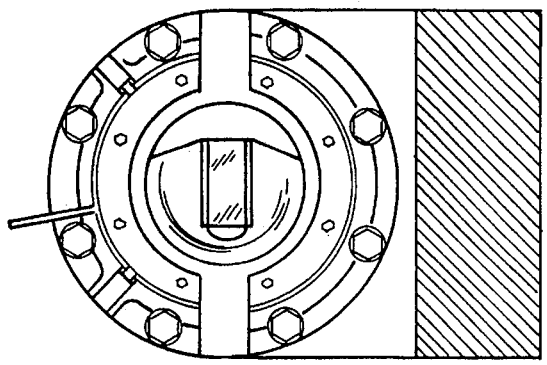
FIG. 9a shows a rotating mount for tuning the birefringent beamsplitter in an exploded view and FIG. 9b is an assembled view of the mount of FIG. 9.
Figure 9A:
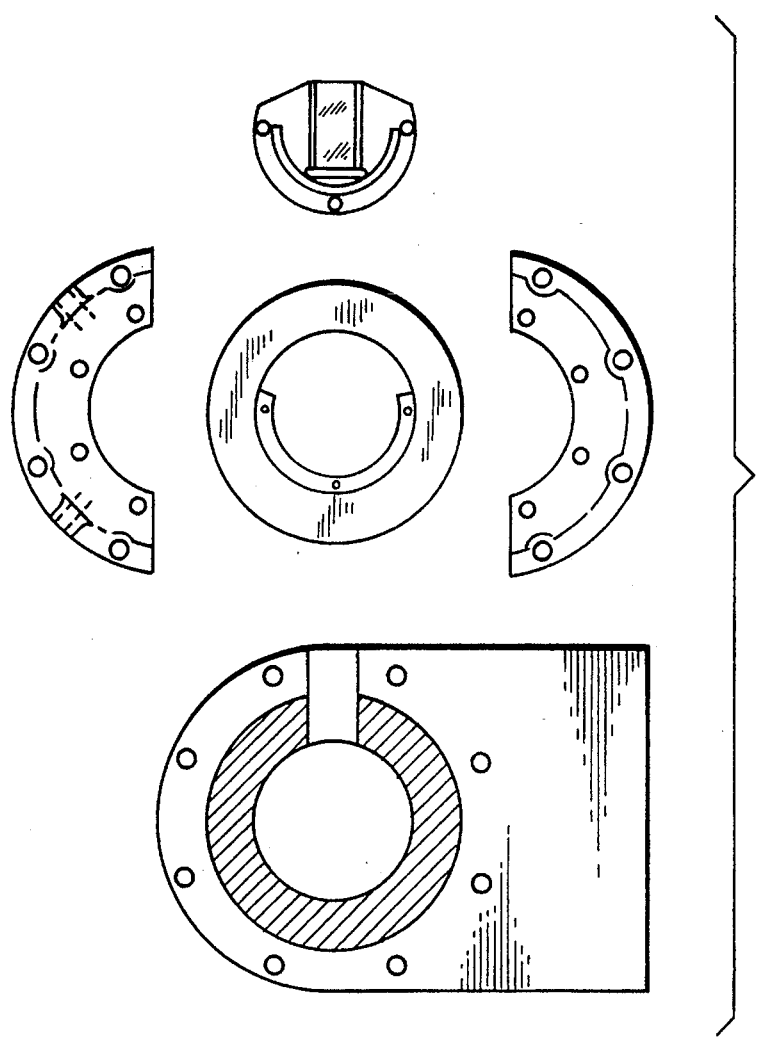

The rotating mount must be able to rotate the beamsplitter perpendicular to its surface without substantially affecting the alignment of the reflected beam. Therefore, ball bearings or other bearing contacts are not preferred. Instead, the rotation should be governed by direct contact between two flat surfaces, one of which is fixed, the other of which holds the crystal and slides over top of the first surface. A suitable mount is illustrated in FIG. 9. To preserve the long term mechanical integrity of the contacting surfaces, the mount and its base should be fabricated of hardened and polished tool steel with an oxide or other solid-lubricating coating (eg. molybdenum disulfide), which will not gall under normal operation of the device, but will allow for sufficiently frictionless rotation under torque. If the surfaces are ground to a flatness of 0.0001 inches over a two inch diameter (which is routine in the present state of the art in machining), then the reflected beam will deviate by no more than 100 micro-radians as the mount is rotated. This deviation is small enough for guiding or directing optical beams in essentially any application. The two surfaces can be held in good contact with one another by means of two flanges attached to the base, and holding several spring-mounted, ball-tipped set screws which press the rotating mount against the base.

In order for the mount to work properly, not only must the axis of rotation remain fixed, but the beamsplitter itself must be precisely perpendicular to this axis. Therefore, the mount should provide a means of attaching an adjustable crystal 'holder' to the rotating surface. Such a means is illustrated in FIG. 9, and entails three fine-pitched, spring-mounted screws between the holder and the rotating mount. Adjustment of the crystal is then straightforward: a visible laser beam is reflected off of the crystal onto a far screen, and the screws are adjusted so that the reflected beam does not wander under rotation of the mount.

In FIG. 7, a schematic illustration of an optical autocorrelator set up 20 is shown. In this set up 20 as mentioned above, the beamsplitter is mounted for rotation in the rotation device as shown in FIG. 9. A beam $i_0$ from a free electron laser is incident on a matching lens and then is incident on the crystal birefringent beamsplitter 22 where the half of the incident beam $i_0$ is illustrated in FIG. 7b when set at the illustrated angle of incidence relative to the beam $i_0$. The split beams 24 and 26 are passed to a manual translation stage comprising a plurality of mirrors 28 and a motor driven stage 30, respectively before passing through a focusing lens 32 (FIG. 7a) and to the autocorrelator crystal 32. Thus, the system can be readily employed as illustrated to measure the duration of ultra short optical pulses from a laser source. It will be evident that the temporal delay introduced can be easily varied as needed.

What is claimed is:

1. In a high intensity laser of the type having three reflective surfaces and beam splitting means for producing a plurality of optical paths using a lasing medium having opposite ends and located between two of said reflective surfaces with the beam splitting means being located between one of the reflective surfaces and one of said ends of the lasing medium, said beam splitting means comprising a birefringent crystal having at least two substantially parallel surfaces, a first one of said optical paths passing between said two reflective surfaces and through said lasing medium, said two parallel surfaces of said crystal intercepting said first one of said optical paths at an angle of interception sufficiently close to Brewster's angle such that another of said optical paths is created from a first one of said two parallel surfaces with a beam having a polarization of one type and a further one of said optical paths is created from the second one of said two parallel surfaces with a beam having a polarization that is different from that of said one type, said further one of said optical paths including said third of said reflective surfaces.

2. The invention as claimed in claim 1 wherein the intensity of said beam having said polarization of the one type is lower than the intensity of said beam having said polarization different from said one type.

3. The invention as claimed in claim 1 wherein said parallel surfaces of said crystal are uncoated.

4. The invention as claimed in claim 1 wherein said angle of interception of said parallel surfaces is variable.

5. The invention as claimed in claim 1 wherein said crystal is sapphire.

6. The invention as claimed in claim 1 wherein said polarization of said one type is generally S type and said different polarization is generally P type.

7. The invention as claimed in claim 1 wherein said lasing medium is a free electron laser.

8. The invention as claimed in claim 1 wherein said third reflective surface is located radially spaced from said first one of said optical paths.

9. In a high intensity laser of the type having three reflective surfaces and beam splitting means for producing a plurality of optical paths using a lasing medium and located between two of said reflective surfaces with the beam splitting means being located between one of the reflective surfaces and said lasing medium, said beam splitting means comprising a birefringent crystal having at least two substantially parallel surfaces, a first one of said optical paths passing between said two reflective surfaces and through said lasing medium, said two parallel surfaces of said crystal intercepting said first one of said optical paths at a selected angle of interception such that another of said optical paths is created from a first one of said two parallel surfaces with a beam having a polarization of one type and a further one of said optical paths is created from the second one of said two parallel surfaces with a beam having a polarization that is different from that of said one type, said further one of said optical paths including said third of said reflective surfaces.

10. The invention as claimed in claim 9 wherein the intensity of said beam having said polarization of the one type is lower than the intensity of said beam having said polarization different from said one type.

11. The invention as claimed in claim 9 wherein said parallel surfaces of said crystal are uncoated.

12. The invention as claimed in claim 9 wherein said angle of interception of said parallel surfaces is variable.

13. The invention as claimed in claim 9 wherein said crystal is sapphire.

14. The invention as claimed in claim 9 wherein said polarization of said one type is generally S type and said different polarization is generally P type.

15. The invention as claimed in claim 9 wherein said lasing medium is a free electron laser.

16. The invention as claimed in claim 9 wherein said third reflective surface is located radially spaced from said first one of said optical paths.

17. The invention as claimed in claim 1 or 9 wherein said first and said another optical paths define a plane, said birefringent crystal being rotated about an axis passing perpendicular to said plane and with said surfaces of said crystal extending substantially perpendicular to said plane and with the a first one of said parallel surfaces closest to said lasing medium being intercepted by said first optical path at an angle approximatel equal to the Brewster angle.

18. The invention as claimed in claim 1 or 9 wherein said first and said another optical paths define a plane, said birefringent crystal being rotated about an axis passing perpendicular to said plane and with said surfaces of said crystal extending substantially perpendicular to said plane and with the first one of said parallel surfaces closest to said lasing medium being intercepted by said first optical path at an angle greater than the Brewster angle.

19. The invention as claimed in claim 1 or 9 wherein said first and said another optical paths define a plane, said birefringent crystal being rotated about an axis passing perpendicular to said plane and with said surfaces of said crystal extending substantially perpendicular to said plain and with the a first one of said parallel surfaces closest to said lasing medium being intercepted by said first optical path at an angle than the Brewster angle.

20. The invention as claimed in claim 1 or 9 wherein a fourth optical path is created by reflection of said beam from the lasing medium by the said surface of said crystal closest to said lasing medium.

21. The invention as claimed in claim 20 wherein said fourth optical path beam is passed to another beam splitter external to said laser and the beams split by said another beam splitter are directed by a plurality of reflective surfaces to an autocorrellator crystal.

22. The invention as claimed in claim 21 wherein said another beam splitter is a birefringent crystal.

23. The invention as claimed in claim 22 wherein said another beam splitter crystal is sapphire.

24. The invention as claimed in claim 22 wherein said another beam splitter crystal is mounted for rotation on a rotation device about an axis passing through the center of the face of the crystal.

25. The invention as claimed in claim 21 wherein said another beam splitter crystal is mounted for rotation about an axis passing through the center of the face of the crystal.

26. The invention as claimed in claim 21 wherein said autocorrelator crystal is silver gallium sulfide.

27. The invention as claimed in claim 1 or 9 wherein said beam splitter crystal is mounted for rotation about an axis passing through the center of the face of the crystal.

* * * * *